United States Patent
Yamamoto (10) Patent No.: US 9,528,550 B2
(45) Date of Patent: Dec. 27, 2016

(54) SLIDING BEARING

(71) Applicant: TAIHO KOGYO CO., LTD., Toyota-shi, Aichi (JP)

(72) Inventor: Katsumi Yamamoto, Aichi (JP)

(73) Assignee: TAIHO KOGYO CO., LTD., Aichi-ken (JP)

( * ) Notice: Subject to any disclaimer, the term of this patent is extended or adjusted under 35 U.S.C. 154(b) by 0 days.

(21) Appl. No.: 14/890,660

(22) PCT Filed: Mar. 13, 2015

(86) PCT No.: PCT/JP2015/057429
§ 371 (c)(1),
(2) Date: Nov. 12, 2015

(87) PCT Pub. No.: WO2015/141572
PCT Pub. Date: Sep. 24, 2015

(65) Prior Publication Data
US 2016/0091021 A1    Mar. 31, 2016

(30) Foreign Application Priority Data

Mar. 19, 2014  (JP) ................................ 2014-056112
Mar. 19, 2014  (JP) ................................ 2014-056115

(51) Int. Cl.
C23C 2/12       (2006.01)
F16C 33/00     (2006.01)
(Continued)

(52) U.S. Cl.
CPC ............. *F16C 33/00* (2013.01); *C22C 21/003* (2013.01); *C22C 21/12* (2013.01); *F16C 33/121* (2013.01); *F16C 2204/22* (2013.01)

(58) Field of Classification Search
None
See application file for complete search history.

(56) References Cited

U.S. PATENT DOCUMENTS

2004/0247932 A1* 12/2004 Kagohara ............. B32B 15/012
                                                                          428/650
2009/0245702 A1   10/2009 Kagohara et al.
(Continued)

FOREIGN PATENT DOCUMENTS

CN         1313911 A      9/2001
CN       101517108 A      8/2009
(Continued)

OTHER PUBLICATIONS

International Search Report for PCT/JP2015/057429 dated Jun. 9, 2015.
(Continued)

*Primary Examiner* — Humera Sheikh
*Assistant Examiner* — Seth Dumbris
(74) *Attorney, Agent, or Firm* — Sughrue Mion, PLLC (57) ABSTRACT

A sliding bearing including: a lining; a back metal; and an intermediate layer formed between the back metal and the lining by an Al alloy containing 0.01 wt % or more of at least one solid solution component selected from Zn, Cu, Mg, Li, Mn, V, Zr, Fe, Mo, Co, Ni, Hf, Sc, Ti and W wherein the whole amount of the solid solution component forms a solid solution with Al, in such a manner that the intermediate layer has a thickness of 20 μm or more and Vickers hardness of 30 or more and 80 or less.

2 Claims, 2 Drawing Sheets

(51) Int. Cl.
     *C22C 21/00*      (2006.01)
     *C22C 21/12*      (2006.01)
     *F16C 33/12*      (2006.01)

(56) References Cited

U.S. PATENT DOCUMENTS

2009/0246072 A1* 10/2009 Nirasawa .............. F16C 33/121
                                                                               420/529
2013/0323524 A1   12/2013 Andler et al.

FOREIGN PATENT DOCUMENTS

| | | |
|---|---|---|
| CN | 102762754 A | 10/2012 |
| EP | 2 105 518 A2 | 9/2009 |
| JP | 11-209836 A | 8/1999 |
| JP | 2000-17363 A | 1/2000 |
| JP | 2009-228870 A | 10/2009 |
| JP | 2010-242854 A | 10/2010 |
| JP | 2014-510194 A | 4/2014 |
| WO | 2012/107288 A1 | 8/2012 |

OTHER PUBLICATIONS

Written Opinion for PCT/JP2015/057429 dated Jun. 9, 2015.
Communication dated May 4, 2016, from the State Intellectual Property Office of People's Republic of China in counterpart Application No. 201580000396.2.

* cited by examiner

Fig.2B

SLIDING BEARING

CROSS REFERENCE TO RELATED APPLICATIONS

This application is a National Stage of International Application No. PCT/JP2015/057429 filed Mar. 13, 2015, claiming priority based on Japanese Patent Application Nos. 2014-056112 filed Mar. 19, 2014 and 2014-056115 filed Mar. 19, 2014, the contents of all of which are incorporated herein by reference in their entirety.

TECHNICAL FIELD

The present invention relates to a sliding bearing.

BACKGROUND ART

Patent Document 1 describes a sliding bearing including a back metal, an Al-based intermediate layer and an Al-based bearing alloy layer. In Patent Document 1, the fatigue strength of the sliding bearing is improved by depositing an intermetallic compound in the Al-based bearing alloy layer. Patent Document 1 describes that, while a hard Al-based intermediate layer is formed, the Al-based intermediate layer, when having a thickness of 10 to 20 μm, can provide good conformability due to the cushioning properties of the Al-based intermediate layer (see Patent Document 1: Table 2 and paragraph [0043]).

PRIOR ART DOCUMENT

Patent Document

Patent Document 1: JP 2010-242854 A

SUMMARY OF THE INVENTION

Problem to be Solved by the Invention

In Cited Reference 1, the component which forms the intermetallic compound in the Al-based bearing alloy layer is contained also in the Al-based intermediate layer at the same level (50 to 150%) as in the Al-based bearing alloy layer (see Patent Document 1: claim 6), and thus an intermetallic compound is also formed in the Al-based intermediate layer. This intermetallic compound has poor affinity with the matrix and constitutes a hard phase having low toughness. Therefore, cracks due to fatigue are disadvantageously apt to be formed from the intermetallic compound or its boundary as a starting point in both of the Al-based bearing alloy layer and the Al-based intermediate layer.

The present invention has been made in light of the above-described problem, and an object thereof is to provide a sliding bearing which can suppress the occurrence of cracks due to fatigue.

Means for Solving the Problem

In order to attain the above-described object, the sliding bearing of the present invention includes a lining, a back metal and an intermediate layer. The lining consists of:
3 wt % or more and 12.5 wt % or less of Sn,
1 wt % or more and 8 wt % or less of Si,
0.05 wt % or more and 3 wt % or less of Cr,
0.05 wt % or more and 0.3 wt % or less of Zr,
0.01 wt % or more and 0.5 wt % or less of Ti,
3 wt % or less of Cu or Mg, and
0 wt % or more and 9 wt % or less of Bi, and
the balance Al with inevitable impurities,
and 10 wt % or more and 90 wt % or less of Cr forms an intermetallic compound with Al, and the rest of Cr forms a solid solution with Al. Ten (10) wt % or more and 90 wt % or less of Cr forms a hard intermetallic compound with Al, thereby making it possible to increase the hardness of the lining and to improve the fatigue resistance. Further, the rest of Cr, which has not formed the intermetallic compound, forms a solid solution with Al, thereby making it possible to strengthen the matrix and to improve the fatigue resistance.

The intermediate layer is formed between the back metal and the lining by an Al alloy containing 0.01 wt % or more of at least one solid solution component selected from Zn, Cu, Mg, Li, Mn, V, Zr, Fe, Mo, Co, Ni, Hf, Sc, Ti and W wherein the whole amount of the solid solution component forms a solid solution with Al, in such a manner that the intermediate layer has a thickness of 20 μm or more and Vickers hardness of 30 or more and 80 or less. The solid solution component forms a solid solution with Al, thereby making it possible to strengthen the matrix and to improve the fatigue resistance. Further, the whole amount of the solid solution component forms a solid solution with Al, and thus no intermetallic compound consisting of the solid solution component and Al would be formed, thereby making it possible to prevent the intermetallic compound or its boundary from serving as the starting point or pass point of cracks when the sliding bearing is fatigued. In other words, the propagation of the cracks generated in the lining throughout the intermediate layer can be prevented. Also, since the ductility and toughness of the intermediate layer can be ensured by suppressing the Vickers hardness of the intermediate layer to 80 or less, it is possible to prevent the propagation of the cracks generated in the lining throughout the intermediate layer. Further, since the thickness of the intermediate layer is defined as 20 μm or more, the propagation of the cracks generated in the lining to the boundary between the intermediate layer and the back metal can be prevented, thereby improving the fatigue resistance.

The lining contains 3 wt % or more of Sn, thereby making it possible to ensure the lubricity and to improve the seizure resistance. The lining contains 1 wt % or more of Si, whereby the hardness of the lining can be increased by Si particles and particles of the intermetallic compound including Si, thereby improving the fatigue resistance. The lining contains 9 wt % or less of Bi, whereby Bi with low agglutination properties to iron can be deposited as a second phase, thereby improving the seizure resistance. However, Bi may not necessarily be included, and the content of Bi may be 0 wt %. Further, the lining contains 0.05 wt % or more and 3 wt % or less of Cr and 0.05 wt % or more and 0.3 wt % or less of Zr, and 3 wt % or less (greater than 0 wt %) of Cu, thereby making possible solid-solution strengthening of the lining and, at the same time, deposition strengthening of the lining due to the intermetallic compound including these elements. Also, the lining contains 3 wt % or less (greater than 0 wt %) of Mg, thereby making possible solid-solution strengthening of the lining. Further, the lining contains 0.01 wt % or more and 0.5 wt % or less of Ti, so that the intermetallic compound (Al$_3$Ti) is finely dispersed and deposited at an early stage of solidification and thus becomes a nucleus of the deposition of Al, thereby making it possible to make Al (α phase) fine.

The sliding bearing of the present invention includes a lining, a back metal and an intermediate layer. The lining consists of:

3 wt % or more and 7 wt % or less of Sn, 1 wt % or more and 8 wt % or less of Si, 0.05 wt % or more and 3 wt % or less of Cr, 0.05 wt % or more and 0.3 wt % or less of Zr, 0.01 wt % or more and 0.5 wt % or less of Ti, 3 wt % or less of Cu or Mg, and 0 wt % or more and 9 wt % or less of Bi, and the balance Al with inevitable impurities, and 10 wt % or more and 90 wt % or less of Zr forms an intermetallic compound with Al, and the rest of Zr forms a solid solution with Al. Ten (10) wt % or more and 90 wt % or less of Zr forms a hard intermetallic compound with Al, thereby making it possible to increase the hardness of the lining and to improve the fatigue resistance. Further, the rest of Zr, which has not formed the intermetallic compound, forms a solid solution with Al, thereby making it possible to strengthen the matrix and to improve the fatigue resistance.

The lining contains 3 wt % or more of Sn, thereby making it possible to ensure the lubricity and to improve the seizure resistance. The Sn content of the lining is defined as 7 wt % or less, thereby making it possible to ensure the fatigue resistance at a high temperature. The lining contains 1 wt % or more of Si, whereby the hardness of the lining can be increased by Si particles and particles of the intermetallic compound including Si, thereby improving the fatigue resistance. The lining contains 9 wt % or less of Bi, whereby Bi with low agglutination properties to iron can be deposited as a second phase, thereby improving the seizure resistance. However, Bi may not necessarily be included, and the content of Bi may be 0 wt %. Further, the lining contains 0.05 wt % or more and 3 wt % or less of Cr and 0.05 wt % or more and 0.3 wt % or less of Zr, and 3 wt % or less (greater than 0 wt %) of Cu, thereby making possible solid-solution strengthening of the lining and, at the same time, deposition strengthening of the lining due to the intermetallic compound including these elements. Also, the lining contains 3 wt % or less (greater than 0 wt %) of Mg, thereby making possible solid-solution strengthening of the lining. Further, the lining contains 0.01 wt % or more and 0.5 wt % or less of Ti, so that the intermetallic compound (Al$_3$Ti) is finely dispersed and deposited at an early stage of solidification and thus becomes a nucleus of the deposition of Al, thereby making it possible to make Al (α phase) fine.

MODE FOR CARRYING OUT THE INVENTION

Now, the embodiments of the present invention are explained in the following order.
A. First Embodiment:
(A1) Configuration of sliding bearing:
(A2) Method for producing sliding bearing:
(A3) Experimental results:
B. Second Embodiment:
(B1) Configuration of sliding bearing:
(B2) Method for producing sliding bearing:
(B3) Experimental results:
C. Other Embodiments:

A. First Embodiment (A1) Configuration of Sliding Bearing

Figure 1:
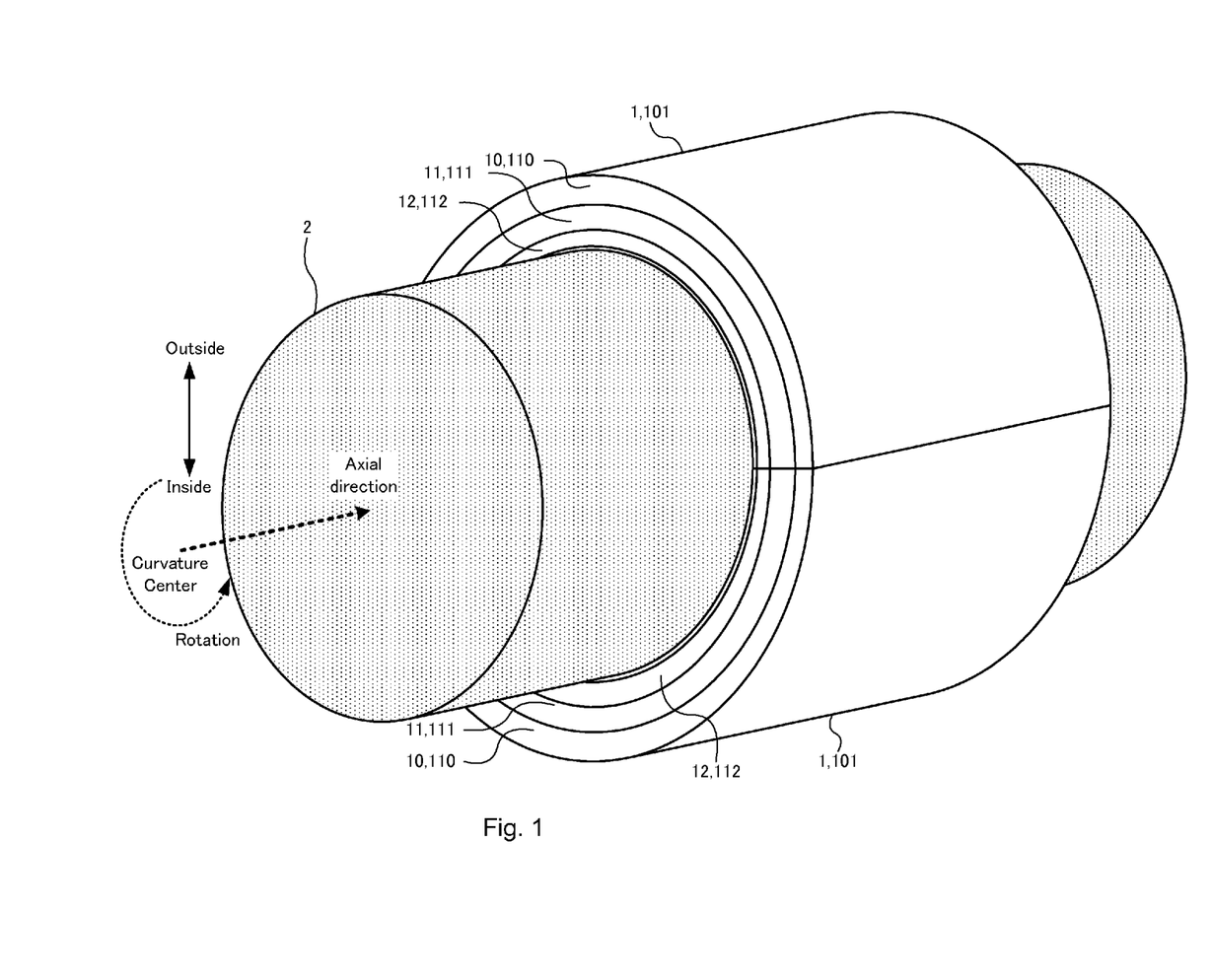
FIG. 1 is a perspective view of a sliding bearing for connecting rod.

FIG. 1 is a perspective view of a sliding bearing 1 according to one embodiment of the present invention. The sliding bearing 1 includes a back metal 10, an intermediate layer 11 and a lining 12. The sliding bearing 1 is a halved metal member obtained by bisecting a cylinder in a diameter direction, and has a semi-arcuate cross section. Two sliding bearings 1 are attached to the connecting rod of an automobile engine in the state where they are combined to form a cylindrical shape. A crank shaft as a counter shaft 2 (dot hatching) is bearing-supported in a columnar hollow portion formed by combination of the two sliding bearings 1. The outer diameter of the counter shaft 2 is formed so as to be slightly smaller than the inner diameter of the sliding bearing 1. A lubricant oil (engine oil) is supplied to a gap formed between the outer peripheral surface of the counter shaft 2 and the inner peripheral surface of the sliding bearing 1. The counter shaft 2 rotates around a rotation axis which coincides with the curvature center of the sliding bearing 1. At that time, the outer peripheral surface of the counter shaft 2 slides on the inner peripheral surface of the sliding bearing 1.

The sliding bearing 1 has a structure such that the back metal 10, intermediate layer 11 and lining 12 are laminated in turn in the order of being away from the curvature center. Thus, the back metal 10 constitutes the outermost layer of the sliding bearing 1, and the lining 12 constitutes the innermost layer of the sliding bearing 1. The back metal 10, intermediate layer 11 and lining 12 each have a constant thickness in their circumferential direction. The thicknesses of the back metal 10, intermediated layer 11 and lining 12 are 1.3 mm, 50 μm and 0.35 mm, respectively. The radius of the surface on the curvature center side of the lining 12 (inner diameter of the sliding bearing 1) is 45 mm. It is only necessary to determine the shape of the sliding bearing 1 in accordance with the shape of the connecting rod or the counter shaft 2, and the width of the sliding bearing 1 may be any value within the range between 10 mm to 300 mm; the outer diameter of the sliding bearing 1 may be a value within the range between 25 mm to 1000 mm; and the entire thickness of the sliding bearing 1 may be any value within the range between 1 mm to 20 mm. Also, the thickness of the lining 12 may be any value within the range between 0.05 mm and 10 mm, and the thickness of the intermediate layer 11 may be any value within the range between 0.02 mm to 2 mm. Hereinafter, the term "inside" means the curvature center side of the sliding bearing 1, and the term "outside" means an opposite side to the curvature center of the sliding bearing 1. The surface of the inside of the lining 12 constitutes a sliding surface on which the counter shaft 2 slides.

The back metal 10 is made of low carbon steel containing 0.15 wt % of C and 0.06 wt % of Mn and the balance Fe with inevitable impurities. In the meantime, the back metal 10 just has to be made of a material which can support the load from the counter shaft 2 via the lining 12, and may not necessarily be made of steel.

The intermediate layer 11 is a layer formed between the back metal 10 and the lining 12. Namely, the intermediate layer 11 is a layer laminated on the inside of the back metal 10 and on the outside of the lining 12. The intermediate layer 11 is made of an aluminum alloy. Specifically, the intermediate layer 11 contains 0.05 wt % of Cu, 0.05 wt % of Zr, 0.02 wt % of Ti and 0.1 wt % of Cr, and the balance Al with inevitable impurities. In the meantime, the masses of the elements which constitute the respective layers of the sliding bearing 1 were measured by using an ICP (Inductively Coupled Plasma) emission spectrum analyzer (ICPS-8100 manufactured by Shimadzu Corporation).

When the Vickers hardness (hardness) of the intermediate layer 11 was measured, the Vickers hardness at room temperature (20° C.) was 30. A sample of the intermediate layer 11 before bonding to the lining 12 and back metal 10 was prepared, and the Vickers hardness of the sample was measured. The Vickers hardness was measured by means of a micro Vickers hardness meter (MVK-EII manufactured by Akashi Seisakusho) while the size of an indentation (average value of the lengths of the two diagonal lines) formed at a measurement point on a test piece with a load of 50 g to 400 g was regarded as the Vickers hardness at the measurement point. The average value of the Vickers hardnesses as measured at 3 to 7 measurement points on the test piece was used as the Vickers hardness of the intermediate layer 11.

From the observation of any cross section of the intermediate layer 11, the absence of an intermetallic compound formed of Al and the components other than Al (Cu, Zr, Ti, Cr) contained in the intermediate layer 11 was confirmed. Specifically, it was confirmed that the whole amount of the components (hereinafter, referred to as the "contained components") other than Al which were contained in the intermediate layer 11, formed a solid solution in the matrix of Al.

The amounts of the contained components were analyzed in the following manner. An electron probe microanalyzer (EPMA) (JXA8100 manufactured by JEOL Ltd.) was used to measure the amounts of the contained components on the matrix (except the deposited product) of the intermediate layer 11 by wavelength-dispersive X-ray spectroscopy at 10 points or more through point analysis, and the average value thereof was measured as the amounts of the solid solutions of the contained components. Further, the amounts of the contained components in the entire visual field including 4 visual fields or more at 500-fold magnification or higher were measured as the total amount of the contained components. The percentage obtained by dividing, by the total amount of the contained components, the value obtained by subtracting the amount of the solid solutions from the total amount of the contained components, was measured as the solid solution proportion as the proportion of the component forming an intermetallic compound with Al among the contained components. When the solid solution proportion was substantially 100% (for example, 98% or more), the whole amount of the contained components was regarded as forming the solid solution in the matrix of Al. In the meantime, the acceleration voltage of the electron beam from the electron probe microanalyzer at the time of analysis was defined as 10 kV.

The lining 12 is a layer laminated on the inside of the intermediate layer 11, and contains 1.3 wt % of Cu, 0.5 wt % of Cr, 0.2 wt % of Zr, 4.5 wt % of Sn, 1.5 wt % of Si, 2 wt % of Bi and 0.01 wt % of Ti, and the balance Al with inevitable impurities. Eighty five (85) wt % of Cr (17 wt % of the entire lining 12) forms an intermetallic compound with Al, and the rest of Cr forms the solid solution with Al. Specifically, when the lining 12 was analyzed by an electron probe microanalyzer to measure the solid solution proportion of Cr as the contained component of the lining 12, the solid solution proportion of Cr was 85 wt %.

The fatigue resistance performance value of the sliding bearing 1, when measured, was 105 MPa. The "fatigue resistance performance value" refers to an upper limit of the surface pressure when no fatigue failure occurred when a fatigue test was conducted by using a reciprocating load test machine which will be described later. Also, the sentence that "fatigue failure occurred" means that a crack which has occurred in the lining 12 during a fatigue test penetrates through the intermediate layer 11 and propagates up to the back metal 10, so that an Al alloy layer consisting of the intermediate layer 11 and the lining 12 lifts from the back metal 10.

Figure 2A:
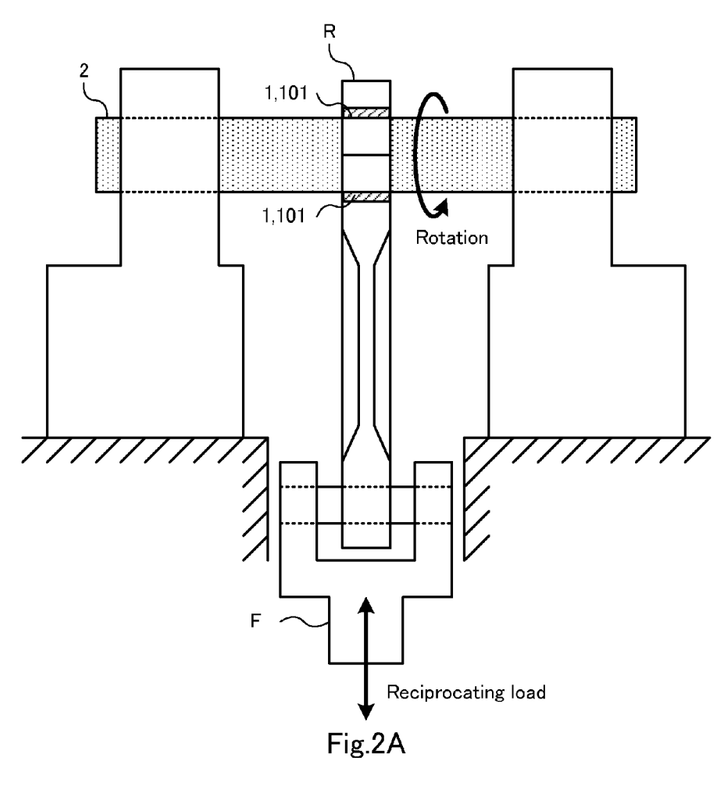
FIG. 2A is a schematical view for illustrating a fatigue test.

FIG. 2A is a schematical view of a fatigue test conducted by using a reciprocating load test machine. As shown in FIG. 2A, a connecting rod R formed with columnar through holes at both ends in the longitudinal direction was provided, and the counter shaft 2 (dot hatching) was bearing-supported through the through hole formed at the one end. In the meantime, two sliding bearings 1 (oblique hatching) were attached onto the inner peripheral surface of the through hole in the connecting rod R which bearing-supports the counter shaft 2, in the state where the sliding bearings were combined into a cylindrical shape. The counter shaft 2 was bearing-supported on both outsides of the connecting rod R in the axial direction of the counter shaft 2, and rotated so that the number of rotations per unit time was 3000 per min. The end part of the connecting rod R on the side opposite to the side on which the counter shaft 2 was bearing-supported was coupled to a moving body F which reciprocates in the longitudinal direction of the connecting rod R, and the reciprocating load of the moving body F was changed each time the fatigue test was conducted. Also, the moving body F was reciprocated so that the number of time of reciprocations of the moving body F per unit time was 3000 per min. Also, engine oil (CF-4, 10W-30) was supplied between the connecting rod R and the counter shaft 2. The temperature of the engine oil was controlled so that the temperature of the sliding bearings 1 during the test was 180° C. In the meantime, the counter shaft 2 was made of carbon steel (S55C) having been subjected to induction hardening. The fatigue test on the sliding bearings 1 was continued until the number of rotations of the counter shaft 2 (number of reciprocations of the moving body F) reached $10^7$. The upper limit of the reciprocating load of the moving body F at which no crack occurred in the sliding surface after the fatigue test was specified, and the surface pressure obtained by dividing the reciprocating load by the contact area between the counter shaft 2 and the sliding bearings 1 was measured as the fatigue resistance performance value.

The seizure resistance performance value of the sliding bearings 1, when measured, was 105 MPa. The "seizure resistance performance value" refers to an upper limit of the surface pressure at which no seizure occurred when a seizure test was conducted by using a static load test machine which will be described below.

Figure 2B:
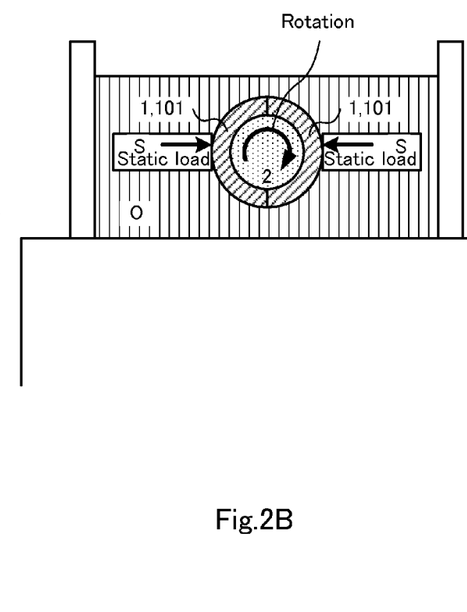
FIG. 2B is a schematical view for illustrating a seizure test.

FIG. 2B is a schematical view of a seizure test conducted by using a static load test machine. As shown in FIG. 2B, sliding bearings 1 (oblique hatching) which bearing-supported a columnar counter shaft 2 (dot hatching) were provided, and the sliding bearings 1 were supported by a pair of holders S from the outer side in the radial direction of the counter shaft 2. The counter shaft 2 was rotated so that the number of rotations per unit time was 1300 to 8000 per min. Also, a static load for bringing the pair of holders S close to each other toward the central axis of the counter shaft 2 was allowed to act on the axis vertically intersecting the center axis of the counter shaft 2, and gradually increased by 5 MPa. Also, the seizure test was conducted in an oil bath so that at least the entire of the sliding bearings 1 were immersed in the engine oil O (SN OW-20). The static load test machine was stopped in the case where the torque required for rotation of the counter shaft 2 reached a predetermined value or more and in the case where the temperature of the sliding bearings 1 reached a predetermined temperature or higher, and the surface pressure (static load per unit contact area) which was allowed to act on the pair of holders S immediately before the stoppage of the static load test machine was measured as the seizure resistance performance value. The "predetermined temperature" refers to a temperature obtained by adding an allowable rising temperature to the target temperature. The target temperature is 20 to 40° C. (room temperature). The temperature of the engine oil O in the oil bath was controlled so that the temperature of the sliding bearings 1 reached the target temperature. The "allowable rising temperature" refers to a temperature of the sliding bearings 1 which can rise in a normal friction state where no seizure occurs, and seizure can be regarded as having occurred when the rising temperature from the target temperature becomes the allowable rising temperature or higher. The upper limit of the static load at which no seizure occurred in the seizure test was specified, and the surface pressure obtained by dividing the static load by the contact area between the counter shaft 2 and the sliding bearings 1 was measured as the seizure resistance performance value.

It has been found that the sliding bearings 1 have the fatigue resistance performance value of 105 MPa, and also have good fatigue resistance, as explained above. Also, it has been found that the sliding bearings 1 have the seizure resistance performance value of 105 MPa, and also have good seizure resistance. It is considered that, in the lining 12, 85 wt % of Cr formed a hard intermetallic compound with Al, thereby making it possible to increase the hardness of the lining 12 and to improve the fatigue resistance. Further, it is considered that, in the lining 12, the rest of Cr, which has not formed the intermetallic compound, formed a solid solution with Al, thereby making it possible to strengthen the matrix of the lining 12 and to improve the fatigue resistance.

It is considered that, in the intermediate layer 11, the components other than Al (Cu, Zr, Ti, Cr) formed the solid solution with Al, thereby making it possible to strengthen the matrix and to improve the fatigue resistance. Further, it is considered that, since the whole amount of the components other than Al forms the solid solution with Al in the intermediate layer 11, no intermetallic compound of Al and the components other than Al would be formed, so that it was possible to prevent the intermetallic compound and its boundary from serving as the starting point or pass point of cracks when the sliding bearing was fatigued. In other words, it is considered that the propagation of the cracks generated in the lining 12 throughout the intermediate layer 11 could be prevented. Also, it is considered that, since the ductility and toughness of the intermediate layer 11 can be ensured by suppressing the Vickers hardness of the intermediate layer 11 to 80 or less, it was possible to prevent the propagation of the cracks generated in the lining 12 throughout the intermediate layer 11. Further, it is considered that the thickness of the intermediate layer 11 is 50 μm, so that it was possible to prevent the propagation of the cracks generated in the lining 12 to the boundary between the intermediate layer 11 and the back metal 10 and to improve the fatigue resistance. It is considered that, since the propagation of the cracks generated in the lining 12 to the boundary between the intermediate layer 11 and the back metal 10 can be prevented, it was possible to prevent the lifting of an Al alloy layer consisting of the intermediate layer 11 and the lining 12 from the back metal 10. Thus, it is considered that frictional heat could be prevented from concentrating and generating at a portion where the Al alloy layer was lifted from the back metal 10, resulting in good seizure resistance.

(A2) Method for Producing Sliding Bearing

In this embodiment, the sliding bearing 1 is produced by performing the following steps in turn: a. forming a lining plate; b. forming an intermediate layer plate; c. pressure bonding; d. cutting; and e. machining. Hereinafter, the respective steps will be explained.

a. Forming Lining Plate

Firstly, in order to form an Al alloy containing 1.3 wt % of Cu, 0.5 wt % of Cr, 0.2 wt % of Zr, 4.5 wt % of Sn, 1.5 wt % of Si, 2 wt % of Bi and 0.01 wt % of Ti, the materials for the respective components (Sn ingots, Bi ingots and base alloys consisting of any other contained component and Al (Al—Cu (Cu: 30 wt %), Al—Cr (Cr: 1 wt %), Al—Zr (Zr: 1 wt %), Al—Ti (Ti: 5 wt %)) were metered and provided. Next, the materials for the respective components were heated up to 850° C. in a high-frequency induction furnace, and held for 15 minutes. Thus, the molten material for the lining 12 would be formed. Thereafter, bubbles of Ar gas were dispersed and jetted for 20 seconds or longer through a porous bubbling pipe or lance pipe so that the flow rate was 2 L/min., for the purpose of removing hydrogen gas and inclusions, and then the material was allowed to stand for 5 minutes or longer.

Next, the molten material for the lining 12 was injected into a mold, and drawn from an opening of the mold in the casting direction, thereby forming a lining plate which served as an original form of the lining 12.

Further, the lining plate was subjected to annealing with rolling. In this annealing step, low-temperature annealing at 305 to 400° C. and high-temperature annealing at 400 to 475° C. were conducted so that the temperature difference between them was 10° C. or higher. The durations of the low-temperature annealing and the high-temperature annealing were controlled to be within the range of 40 to 180 minutes, thereby controlling the solid solution proportion of the component in Cr which formed an intermetallic compound with Al. It is only necessary to increase the annealing durations in order to increase the solid solution proportion of the component in Cr which forms an intermetallic compound with Al, whereas to decrease the annealing durations in order to decrease the solid solution proportion of the component which forms an intermetallic compound. For example, the solid solution proportion of Cr may be increased by annealing at a high-temperature annealing temperature (400 to 460° C.) for 60 minutes or longer and 140 minutes or shorter. The solid solution proportion of Cr may be decreased by annealing at a high-temperature annealing temperature for 40 minutes or longer and shorter than 60 minutes.

b. Forming Intermediate Layer Plate

Firstly, in order to form an Al alloy containing 0.05 wt % of Cu, 0.05 wt % of Zr, 0.02 wt % of Ti and 0.1 wt % of Cr, the materials for the respective components (Sn ingots and base alloys consisting of any other contained component and Al (Al—Cu (Cu: 30 wt %), Al—Cr (Cr: 1 wt %), Al—Zr (Zr: 1 wt %), Al—Ti (Ti: 5 wt %)) were metered and provided.

Next, the materials for the respective components were heated up to 850° C. in a high-frequency induction furnace, and held for 15 minutes. Thus, the molten material for the intermediate layer 11 would be formed. Thereafter, bubbles of Ar gas were dispersed and jetted for 20 seconds or longer through a porous bubbling pipe or lance pipe so that the flow rate was 2 L/min., for the purpose of removing hydrogen gas and inclusions, and then the material was allowed to stand for 5 minutes or longer. Next, the molten material for the intermediate layer 11 was injected into a mold, and drawn from an opening of the mold in the casting direction, thereby forming an intermediate layer plate which served as an original form of the intermediate layer 11. In the meantime, the intermediate layer plate may be formed by extrusion molding. Also, the thickness of the intermediate layer plate was controlled by rolling after the formation of the intermediate layer plate.

c. Pressure Bonding

Next, the lining plate and intermediate layer plate were rolled in the state where they were overlaid on each other in the thickness direction, thereby forming an Al pressured-bonded plate in which the lining plate and intermediate layer plate were pressure-bonded to each other. Predetermined heat treatment was applied to the Al pressure-bonded plate, thereby completing the pressure-bonding of the Al pressure-bonded plate.

Further, a low carbon steel plate which served as an original form of the back metal 12 was provided, and the low carbon steel plate and Al pressure-bonded plate were rolled in the state where they were overlaid on each other in the thickness direction, thereby forming a rolled plate of the sliding bearing 1 in which the low carbon steel plate and Al pressure-bonded plate were pressure-bonded to each other. Predetermined heat treatment was applied to the rolled plate of the sliding bearing 1, thereby completing the pressure-bonding of the rolled plate of the sliding bearing 1.

In the pressure bonding of the lining plate, intermediate layer plate and low carbon steel plate, either cold rolling or hot rolling may be carried out. Also, it is only necessary to control the thicknesses of the lining plate, intermediate layer plate and low carbon steel plate before pressure bonding so as to attain the target thicknesses after the pressure bonding of the rolled plate of the sliding bearing 1 in consideration of the amounts of the reduction of the thicknesses (rolling ratios) of the respective plates in pressure bonding.

d. Cutting

Next, the rolled plate of the sliding bearing 1 was cut into pieces each having a predetermined size. The "predetermined size" refers to a size which allows for formation of the sliding bearing 1 by machining which will be described later and is defined depending on the shape of the connecting rod to which the sliding bearing 1 is attached.

e. Machining

Finally, a halved sliding bearing 1 was formed by applying press working to the rolled plate of the sliding bearing 1 after cutting. Further, its shape and surface state were finished by cutting work, thereby completing the sliding bearing 1.

(A3) Experimental Results

Table 1 indicates results of measurement of the mechanical properties (fatigue resistance performance value and seizure resistance performance value) of the respective test pieces of the sliding bearing 1 (Examples 1 to 4 of the present invention and Comparative Examples 1 to 3). The above-described embodiment has the same configuration as that of Example 4. The respective test pieces were produced by a method similar to that of the method for producing the sliding bearing 1 as described above. The respective mechanical properties were measured by a method similar to that of the above-described embodiment.

TABLE 1

| Samples | | Al | Cu [wt %] | Cr [wt %] | Zr [wt %] | Sn [wt %] | Si [wt %] | Bi [wt %] | Ti [wt %] | Proportion of Cr which constitutes intermetallic compound [wt %] |
|---|---|---|---|---|---|---|---|---|---|---|
| Examples | 1 | Balance | 2.00 | 0.15 | 0.15 | 15.00 | 5.00 | 0.00 | 0.03 | 45 |
| | 2 | Balance | 1.50 | 0.10 | 0.08 | 13.00 | 3.20 | 0.00 | 0.06 | 60 |
| | 3 | Balance | 1.10 | 0.13 | 0.00 | 6.00 | 4.00 | 0.00 | 0.00 | 75 |
| | 4 | Balance | 1.30 | 0.50 | 0.20 | 4.50 | 1.50 | 2.00 | 0.01 | 85 |
| Comparative Examples | 1 | Balance | 3.30 | 0.20 | 0.30 | 7.00 | 0.50 | 0.00 | 0.05 | 90 |
| | 2 | Balance | 0.10 | 0.50 | 0.00 | 0.00 | 4.50 | 8.00 | 0.01 | 15 |
| | 3 | Balance | 0.00 | 0.10 | 0.30 | 20.00 | 6.00 | 0.00 | 0.00 | 5 |

| Samples | | Al | Cu [wt %] | Zr [wt %] | Ti [wt %] | Cr [wt %] | Vickers hardness | Thickness [μm] | Fatigue resistance performance value | Seizure resistance performance value [Mpa] |
|---|---|---|---|---|---|---|---|---|---|---|
| Examples | 1 | Balance | 0.10 | 0.05 | 0.03 | 0.10 | 25 | 25 | 120 | 85 |
| | 2 | Balance | 1.50 | 0.02 | 0.05 | 0.00 | 65 | 30 | 100 | 95 |
| | 3 | Balance | 2.30 | 0.01 | 0.00 | 0.00 | 75 | 40 | 105 | 100 |
| | 4 | Balance | 0.05 | 0.05 | 0.02 | 0.10 | 30 | 50 | 105 | 105 |
| Comparative Examples | 1 | Balance | 0.02 | 0.05 | 0.50 | 0.15 | 25 | 15 | 80 | 60 |
| | 2 | Balance | 6.00 | 0.10 | 0.02 | 0.13 | 95 | 10 | 75 | 80 |
| | 3 | Balance | 3.00 | 0.01 | 0.03 | 0.00 | 10 | 30 | 95 | 65 |

As indicated in Table 1, in the linings 12 of Examples 1 to 4, 45 to 85 wt % of Cr formed an intermetallic compound, and the rest thereof formed a solid solution, thereby making it possible to improve the hardness of the linings 12 of Examples 1 to 4 and to obtain good fatigue resistance. Here, Cr in the Al alloy is an element from which an intermetallic compound is easily deposited in accordance with heat treatment, and not only the amount of the intermetallic compound deposited but also the size of the particles is easily controlled, for example, depending on the time for heat treatment. Especially, the intermetallic compound of Al and Cr is apt to be deposited in the grain boundary, and thus can efficiently suppress the reduction in fatigue resistance due to Sn when the alloy contains Sn (12.5 wt % or less) in a large amount, which is similarly apt to be deposited in the grain boundary. Further, the sizes of the individual particles of the intermetallic compound of Cr are uniform, and thus the amount of the intermetallic compound of Cr to be deposited can be easily analyzed. Accordingly, it becomes easy to manage (condition setting) the heat treatment time for realizing the desired fatigue resistance by paying attention to the solid solution proportion of Cr in the lining 12.

Also, the Vickers hardness of the intermediate layer 11 was defined as 25 to 75 and the thickness thereof was defined as 25 to 50 µm in Examples 1 to 4, so that the intermediate layer 11 could prevent the propagation of cracks, leading to the improvement in fatigue resistance and seizure resistance. It is considered that the intermediate layer 11 had proper thickness and ductility and toughness and thus can be plastically deformed, thereby making it possible to prevent the propagation of cracks up to the back metal 10. Also, the intermediate layer 11 was free of a hard intermetallic compound, thereby making it also possible to prevent the intermetallic compound from serving as the starting point for peeling between the intermediate layer 11 and the back metal 10, and to prevent the fatigue failure which would cause the lifting of the intermediate layer 11 from the back metal 10.

It is considered that, in Comparative Example 2, the intermediate layer 11 had too great Vickers hardness and was too thin to cause plastic deformation, and thus could not prevent the propagation of cracks, so that it could not exert good fatigue resistance or seizure resistance. It is considered that, in Comparative Example 1, the intermediate layer 11 had proper Vickers hardness but was too thin to cause plastic deformation, and thus could not prevent the propagation of cracks, so that it could not exert good fatigue resistance or seizure resistance. Further, it is considered that, in Comparative Example 3, the intermediate layer 11 had proper thickness but too small Vickers hardness, and thus had insufficient strength, so that seizure easily occurred at a portion where the intermediate layer 11 was destroyed.

B. Second Embodiment (B1) Configuration of Sliding Bearing

A sliding bearing 101 of the second embodiment of the present invention also has a similar appearance to that of the sliding bearing 1 of the first embodiment shown in FIG. 1, and includes a back metal 110, an intermediate layer 111 and a lining 112, similarly to the sliding bearing 1 of the first embodiment. The configuration of a back metal 110 of the sliding bearing 101 is similar to that of the back metal 10 of the sliding bearing 1 of the first embodiment.

The intermediate layer 111 contains 3 wt % of Cu, 0.15 wt % of Zr, 0.02 wt % of Ti and 0.08 wt % of Cr, and the balance Al with inevitable impurities. When the Vickers hardness (hardness) of the intermediate layer 111 was measured by a method similar to that in the first embodiment, the Vickers hardness at room temperature (20° C.) was 70.

When any cross section of the intermediate layer 111 was analyzed by an analysis method similar to that used in the first embodiment, the absence of an intermetallic compound formed of Al and the components other than Al (Cu, Zr, Ti, Cr) contained in the intermediate layer 111 was confirmed. Specifically, it was confirmed that the whole amount of the components other than Al contained in the intermediate layer 111 formed the solid solution in the matrix of Al.

The lining 112 contains 1.2 wt % of Cu, 0.15 wt % of Cr, 0.2 wt % of Zr, 6 wt % of Sn, 5 wt % of Si and 0.03 wt % of Ti, and the balance Al with inevitable impurities. Eighty (80) wt % of Zr (16 wt % of the entire lining 112) forms an intermetallic compound with Al, and the rest of Zr forms the solid solution with Al. Specifically, when the lining 112 was analyzed by an electron probe microanalyzer to measure the solid solution proportion of Zr as the contained component of the lining 112, the solid solution proportion of Zr was 80 wt %.

The fatigue resistance performance value of the sliding bearing 101, when measured by a measurement method similar to that of the first embodiment, was 110 MPa. The seizure resistance performance of the sliding bearing 101, when measured by a measurement method similar to that of the first embodiment, was 95 MPa.

(B2) Method for Producing Sliding Bearing

The sliding bearing 101 is also produced by performing the following steps in turn: a. forming a lining plate; b. forming an intermediate layer plate; c. pressure bonding; d. cutting; and e. machining. Hereinafter, the respective steps will be explained. Among the above steps, c. pressure bonding, d. cutting, and e. machining are similar to those of the above-described embodiment.

a. Forming Lining Plate

Firstly, in order to form an Al alloy containing 1.2 wt % of Cu, 0.15 wt % of Cr, 0.2 wt % of Zr, 6 wt % of Sn, 5 wt % of Si and 0.03 wt % of Ti, the materials for the respective components (Sn ingots, and base alloys consisting of any other contained component and Al (Al—Cu (Cu: 30 wt %), Al—Cr (Cr: 1 wt %), Al—Zr (Zr: 1 wt %), Al—Ti (Ti: 5 wt %)) were metered and provided. Next, the materials for the respective components were heated up to 850° C. in a high-frequency induction furnace, and held for 15 minutes. Thus, the molten material for the lining 112 would be formed. Thereafter, bubbles of Ar gas were dispersed and jetted for 20 seconds or longer through a porous bubbling pipe or lance pipe so that the flow rate was 2 L/min., for the purpose of removing hydrogen gas and inclusions, and then the material was allowed to stand for 5 minutes or longer.

Next, the molten material for the lining 112 was injected into a mold, and drawn from an opening of the mold in the casting direction, thereby forming a lining plate which served as an original form of the lining 112.

Further, the lining plate was subjected to annealing with rolling. In this annealing step, low-temperature annealing at 305 to 400° C. and high-temperature annealing at 400 to 475° C. were conducted so that the temperature difference between them was 10° C. or higher. The durations of the low-temperature annealing and the high-temperature annealing were controlled to be within the range of 40 to 180 minutes, thereby controlling the solid solution proportion of the component in Zr which formed an intermetallic compound with Al. It is only necessary to increase the annealing durations in order to increase the solid solution proportion of the component in Zr which forms an intermetallic compound with Al, whereas to decrease the annealing durations in order to decrease the solid solution proportion of the component which forms an intermetallic compound. For example, the solid solution proportion of Zr may be increased by annealing at a high-temperature annealing temperature (440 to 475° C.) for 80 minutes or longer and 160 minutes or shorter. The solid solution proportion of Zr may be decreased by annealing at a high-temperature annealing temperature for 40 minutes or longer and shorter than 80 minutes.

(B3) Experimental Results

Table 2 indicates results of measurement of the mechanical properties (fatigue resistance performance value and seizure resistance performance value) of the respective test pieces of the sliding bearing 101 (Examples 11 to 14 of the present invention and Comparative Examples 11 to 13). The second embodiment has the same configuration as that of Example 14. The respective test pieces were produced by a method similar to that of the method for producing the sliding bearing 101 as described above. The respective mechanical properties were measured by a method similar to that of the above-described embodiment.

TABLE 2

| | | | | | Configuration of lining | | | | | |
|---|---|---|---|---|---|---|---|---|---|---|
| Samples | | Al | Cu [wt %] | Cr [wt %] | Zr [wt %] | Sn [wt %] | Si [wt %] | Bi [wt %] | Ti [wt %] | Proportion of Cr which constitutes intermetallic compound [wt %] |
| Examples | 11 | Balance | 1.00 | 0.25 | 0.08 | 8.00 | 3.00 | 0.00 | 0.05 | 65 |
| | 12 | Balance | 0.50 | 0.00 | 0.10 | 15.00 | 2.50 | 0.00 | 0.02 | 70 |
| | 13 | Balance | 1.50 | 0.20 | 0.22 | 0.00 | 4.00 | 3.00 | 0.00 | 85 |
| | 14 | Balance | 1.20 | 0.15 | 0.20 | 6.00 | 5.00 | 0.00 | 0.03 | 80 |
| Comparative Examples | 11 | Balance | 0.00 | 0.00 | 0.40 | 10.00 | 1.00 | 0.00 | 0.60 | 95 |
| | 12 | Balance | 1.50 | 0.30 | 0.02 | 0.00 | 9.00 | 5.00 | 0.00 | 15 |
| | 13 | Balance | 3.50 | 0.00 | 0.10 | 4.00 | 3.50 | 0.00 | 0.02 | 100 |

| | | Configuration of intermediate layer | | | | | | Fatigue resistance performance value | Seizure resistance performance value [Mpa] |
|---|---|---|---|---|---|---|---|---|---|
| Samples | | Al | Cu [wt %] | Zr [wt %] | Ti [wt %] | Cr [wt %] | Vickers hardness | Thickness [μm] | | |
| Examples | 11 | Balance | 2.80 | 0.13 | 0.05 | 0.02 | 30 | 35 | 110 | 100 |
| | 12 | Balance | 2.00 | 0.10 | 0.50 | 0.10 | 45 | 35 | 100 | 90 |
| | 13 | Balance | 2.50 | 0.07 | 0.03 | 0.05 | 50 | 45 | 105 | 95 |
| | 14 | Balance | 3.00 | 0.15 | 0.02 | 0.08 | 70 | 40 | 110 | 95 |
| Comparative Examples | 11 | Balance | 0.05 | 0.01 | 0.00 | 0.00 | 15 | 15 | 85 | 70 |
| | 12 | Balance | 0.00 | 0.05 | 0.00 | 0.01 | 25 | 30 | 75 | 65 |
| | 13 | Balance | 5.00 | 0.50 | 0.30 | 0.50 | 85 | 10 | 85 | 80 | b. Forming Intermediate Layer Plate

Firstly, in order to form an Al alloy containing 3 wt % of Cu, 0.15 wt % of Zr, 0.02 wt % of Ti and 0.08 wt % of Cr, the materials for the respective components (Sn ingots and base alloys consisting of any other contained component and Al (Al—Cu (Cu: 30 wt %), Al—Cr (Cr: 1 wt %), Al—Zr (Zr: 1 wt %), Al—Ti (Ti: 5 wt %)) were metered and provided. Next, the materials for the respective components were heated up to 850° C. in a high-frequency induction furnace, and held for 15 minutes. Thus, the molten material for the intermediate layer 111 would be formed. Thereafter, bubbles of Ar gas were dispersed and jetted for 20 seconds or longer through a porous bubbling pipe or lance pipe so that the flow rate was 2 L/min., for the purpose of removing hydrogen gas and inclusions, and then the material was allowed to stand for 5 minutes or longer. Next, the molten material for the intermediate layer 111 was injected into a mold, and drawn from an opening of the mold in the casting direction, thereby forming an intermediate plate which served as an original form of the intermediate layer 111. In the meantime, the intermediate layer plate may be formed by extrusion molding. Also, the thickness of the intermediate layer plate was controlled by rolling after the formation of the intermediate layer plate.

As indicated in Table 2, in the linings 112 of Examples 11 to 14, 45 to 85 wt % of Zr formed an intermetallic compound, and the rest thereof formed a solid solution, thereby making it possible to improve the hardness of the linings 112 of Examples 11 to 14 and to obtain good fatigue resistance. Here, Zr in the Al alloy is an element which easily controls the balance between the amount of the intermetallic compound deposited and the amount of Zr which forms the solid solution depending, for example, on the time for heat treatment etc. Also, when the alloy does not contain Sn (7 wt % or less) in a large amount, which is similarly apt to be deposited in the grain boundary, the destruction within the matrix grains becomes more dominant than the destruction of the grain boundary due to Sn. Thus, the fatigue resistance of the lining 112 can be effectively improved by controlling the amount of Zr which forms the solid solution in the liming 112. Accordingly, it becomes easy to manage (condition setting) the heat treatment time for realizing the desired fatigue resistance by paying attention to the solid solution proportion of Zr in the lining 112.

The Vickers hardness of the intermediate layer 111 was defined as 30 to 70 and the thickness thereof was defined as 35 to 40 μm in Examples 11 to 14, so that the intermediate layer 111 could prevent the propagation of cracks, leading to the improvement in fatigue resistance and seizure resistance.

It is considered that the intermediate layer 111 had proper thickness, ductility, and toughness and thus can be plastically deformed, thereby making it possible to prevent the propagation of cracks up to the back metal 110. Also, the intermediate layer 111 was free of a hard intermetallic compound, thereby making it also possible to prevent the intermetallic compound from serving as the starting point for peeling between the intermediate layer 111 and the back metal 110, and to prevent the fatigue failure which would cause the lifting of the intermediate layer 111 from the back metal 110.

It is considered that, in Comparative Example 13, the intermediate layer 111 had too great Vickers hardness and was too thin to cause plastic deformation, and thus could not prevent the propagation of cracks, so that it could not exert good fatigue resistance or seizure resistance. It is considered that, in Comparative Example 11, the intermediate layer 111 had too small Vickers hardness and thickness, so that it could not exert good fatigue resistance or seizure resistance. It is considered that Comparative Examples 11 and 13 could not exert good fatigue resistance or seizure resistance because of too large an amount of the metal compound as a hard phase in the lining 112. Further, it is considered that Comparative Example 12 could not exert good fatigue resistance or seizure resistance because of an insufficient amount of the metal compound as a hard phase in the lining 112.

C. Other Embodiments

Although the sliding bearing 1, 101 of the present invention was used for a connecting rod in the above-described embodiments, the use of the sliding bearing 1, 101 is not limited to the connecting rod. For example, the sliding bearing 1 of the present invention may be applied to thrust bearings. Also, the sliding bearing 1 may be formed with an overlay on the lining 12, 112, and the overlay may be either a metal layer or a resin layer.

In the present invention, the whole amount of a solid-solution strengthening component just has to be dissolved as a solid solution in the matrix of the lining 12, 112, and the lining 12, 112 may contain 0.3 wt % or more and 5.0 wt % or less of Mg as the solid-solution strengthening component. The incorporation of 0.3 wt % or more of Mg in the lining 12, 112 can cause solid-solution strengthening, resulting in good fatigue resistance. The incorporation of 5.0 wt % or less of Mg in the lining 12, 112 can cause the whole amount of Mg to be dissolved as a solid solution in the matrix. Similarly, the lining 12, 112 may contain 0.3 wt % or more and 5.0 wt % or less of Ag as the solid-solution strengthening component. Further, the lining 12, 112 may contain 0.3 wt % or more and 2.0 wt % or less of Cu as the solid-solution strengthening component. Also, both of Cu and Ag may be contained in the lining 12, 112, and the sum of the Cu and Ag amounts is defined as 6.0 wt % or less so that the whole amount of Cu and Ag can be dissolved as a solid solution in the matrix. Cu and Ag do not form an intermetallic compound even when concurrently contained in Al, and thus both can be dissolved as a solid solution in the lining 12, 112.

The content of the solid solution component in the intermediate layer 11, 111 is sufficiently equal to or less than the solid solution limit within which the whole amount of the solid solution component can form a solid solution in the matrix, and just has to be controlled within the solid solution limit so as to provide proper Vickers hardness of the intermediate layer 11, 111. The thickness of the intermediate layer 11, 111 may be increased as the proportion of Cr or Zr contained in the lining 12, 112, which forms an intermetallic compound, becomes greater. Also, the whole amount of at least one solid solution component selected from Zn, Cu, Mg, Li, Mn, V, Zr, Fe, Mo, Co, Ni, Hf, Sc, Ti and W just has to form a solid solution in the intermediate layer 11, 111, and the components other than the solid solution component may not necessarily form a solid solution in the intermediate layer 11, 111.

EXPLANATION OF REFERENCE NUMERALS 1, 101 . . . Sliding bearing
2 . . . Counter shaft
10, 110 . . . Back metal
11, 111 . . . Intermediate layer
12, 112 . . . Lining
F . . . Moving body
R . . . Connecting rod
S . . . Holder

The invention claimed is:
1. A sliding bearing comprising:
a lining consisting of:
3 wt % or more and 12.5 wt % or less of Sn,
1 wt % or more and 8 wt % or less of Si,
0.05 wt % or more and 3 wt % or less of Cr,
0.05 wt % or more and 0.3 wt % or less of Zr,
0.01 wt % or more and 0.5 wt % or less of Ti,
3 wt % or less of Cu or Mg, and
0 wt % or more and 9 wt % or less of Bi, and
the balance Al with inevitable impurities,
10 wt % or more and 90 wt % or less of Cr forming an intermetallic compound with Al, and the rest of Cr forming a solid solution with Al;
a back metal; and
an intermediate layer formed between the back metal and the lining by an Al alloy containing 0.01 wt % or more of at least one solid solution component selected from Zn, Cu, Mg, Li, Mn, V, Zr, Fe, Mo, Co, Ni, Hf, Sc, Ti and W wherein the whole amount of the solid solution component forms a solid solution with Al, in such a manner that the intermediate layer has a thickness of 20 µm or more and Vickers hardness of 30 or more and 80 or less.
2. A sliding bearing comprising:
a lining consisting of:
3 wt % or more and 7 wt % or less of Sn,
1 wt % or more and 8 wt % or less of Si,
0.05 wt % or more and 3 wt % or less of Cr,
0.05 wt % or more and 0.3 wt % or less of Zr,
0.01 wt % or more and 0.5 wt % or less of Ti,
3 wt % or less of Cu or Mg, and
0 wt % or more and 9 wt % or less of Bi, and
the balance Al with inevitable impurities,
10 wt % or more and 90 wt % or less of Zr forming an intermetallic compound with Al, and the rest of Zr forming a solid solution with Al;
a back metal; and
an intermediate layer formed between the back metal and the lining by an Al alloy containing 0.01 wt % or more of at least one solid solution component selected from Zn, Cu, Mg, Li, Mn, V, Zr, Fe, Mo, Co, Ni, Hf, Sc, Ti and W wherein the whole amount of the solid solution component forms a solid solution with Al, in such a manner that the intermediate layer has a thickness of 20 μm or more and Vickers hardness of 30 or more and 80 or less.

* * * * *